Patented Nov. 10, 1942

2,301,787

UNITED STATES PATENT OFFICE 2,301,787

RECOVERY OF SAPONIN

Gustav Jean Nord, Asheville, N. C.

No Drawing. Application August 6, 1941,
Serial No. 405,717

5 Claims. (Cl. 260—210)

My invention relates to a new and novel process for the recovery of saponin from the juice of saponin bearing cactus or agave plants.

An object of the invention is to provide a simple and inexpensive method of isolating the saponin, which saponin will be almost colorless, of low ash content, and of low toxicity.

Still another object, therefore, of the invention is to provide a method for extracting the saponin from the cactus or agave plant, which plant is plentiful in the midwestern part of the United States, but heretofore has had but little commercial value. I am thus able to produce saponin of high quality but at a low commercial cost. At the present time, saponin is mainly derived from the quillaja bark, which has to be imported from the Latin American countries, thus making the cost exceedingly high.

A number of species of agaves known as Amoles, lechuguilla, yuccas, soapweeds and others contain such an abundant supply of saponin that the fleshy parts of the leaves, bases and sometimes the roots, each when rubbed in water, makes a good lather and serves excellently as a substitute for soap. These plants have, since earliest times, been employed as soaps, hair washes, fish poisons and have been preferred for washing delicate fabrics and for cleaning use in the presence of sensitive dyes. As is well known, saponins are glycosidic substances, which, in addition to their foaming action, are recognizable by their ability to bring about hemolysis of red blood corpuscles even at high dilutions. Many have a bitter taste, cause sneezing and irritate the eyes.

I might mention at the outset that histochemical studies have revealed that saponin is present in the tracheal veins, and is distributed rather abundantly in the parenchymatous tissue surrounding the fibers of these desert plants (cactus), and I have found that the saponin also occurs in the sap of the cells. The fact that saponin is strongly hygroscopic suggested that it might also be in true solution in the plant juice. To further confirm this I evaporated some of the freshly pressed and strained juice and I obtained a saponin powder that compared favorably with crude saponin made from other botanical sources which are currently used commercially.

Heretofore, the bulk of commercial saponin has been imported from Great Britain and Germany. These imported saponins, together with those made in the United States are derived mainly from Latin American soapbark or quillaja bark, and some of the methods for their isolation have been described in prior art patents. Most of these processes make use of dehydrated and chopped or otherwise finely divided saponin-bearing vegetation which for a period of time is either soaked or exhaustively extracted with water and/or other organic solvents and reagents. Depending upon the specific process employed, further elaborate and costly steps are proposed to purify the extract to finally recover the dissolved saponin by means of precipitation or otherwise.

In contrast to these known methods, my novel process consists essentially in pressing the juice from the freshly cut leaves and/or fleshy bases of the agave or cactus plants in a suitable apparatus exerting sufficient pressure to rupture the cells of the fibrous pulp in order to obtain the maximum amount of saponin-containing juice. Depending upon the vegetation employed, the juice extraction may be accomplished by the use of juice extractors of the feed screw type, Cage oil presses—either hydraulic or screw type—or by means of roller cane mills.

The expressed juice is next treated with a suitable filter aid, preferably a diatomaceous earth, of from 1% to 2% of the weight of the liquid and is then pumped through a filter press of conventional design. To secure best results for the removal of suspended organic impurities and coloring matter, the filter aid should be intimately mixed with the plant juice and the mixture kept agitated the entire time filtration is in progress.

The clarified juice is then heated in a jacketed vessel for about thirty minutes at a temperature of approximately 85° C. I found this temperature to be most satisfactory for the inactivation of hydrolytic enzymes in order to isolate the glycoside without hydrolysis, and also to prevent secondary changes.

It is known that the saponins are all glycosides, and some of them are extremely sensitive to the hydrolytic action of acids, bases or enzymes.

A further object of the treatment is to precipitate coagulated proteins and other substances, and to sterilize the liquid to lessen the danger of growth of undesirable microorganisms.

The pH value of the clarified juice being about $5\pm$ is ideal for the precipitation of proteins and no additional agents are thus required to bring about this reaction.

After heating as above mentioned, the precipitate is strained or filtered off and the liquid is rapidly cooled to approximately room temperature with considerable agitation. The cooled liquid is then treated with a diatomaceous filter aid and the precipitated compounds which are insoluble at the lower temperatures are filtered off.

If a purified grade of saponin of low ash content is desired, activated carbon in the amount of about 1% of the weight of the liquid is added and the mixture is agitated for about twenty minutes. The carbon, now holding the remaining impurities firmly adsorbed on its surface, is removed by simple filtration. As in the above described method for clarification proper contact between the carbon and the liquid treated is of great importance. The adsorbent action of activated carbon for alkaloids, pathogenic bacteria, enzymes, toxins, and poisons of various sorts is well known. The use of activated carbon and/or diatomaceous filter aid offers a simple means of replacing older and more complicated purification methods and as far as I have been able to learn, this method of adsorption is not in use for the purification of saponin solutions.

The resulting filtrate obtained by the foregoing method is a saponin solution of exceptional clarity and purity which may be evaporated to dryness in vacuo and pulverized to a soluble powder; or it may preferably be dried by means of a spray dryer and collected in powder form. Heating the saponin solution to a temperature higher than 110° C. is not safe since it causes decomposition and darkening of the compound.

I prefer spray drying to other systems of drying liquids because of the simplicity in reducing a liquid to soluble powder in one operation, usually within about five seconds. Also, the temperature of the particle, while evaporating moisture can never exceed the wet bulb temperature of the hot air surrounding it; the same evaporation would occur if an actual vacuum were maintained outside the particle. The energy of evaporation comes largely from within the particle and it is, therefore, a cooling process. This is highly important with heat sensitive products such as saponin solutions. Obviously, the liquid may be dried by other methods without in any way departing from the spirit and scope of this invention and I do not wish, therefore, to be limited to the above described drying methods.

As will be seen from the above description of the process, my method has been reduced to a minimum of operations with considerable economy, and the saponin is recovered by means of simple technical expedients.

The following results were obtained on analysing a number of samples of the saponin produced by the above described method and the empirical formula $C_{27}H_{48}O_{20}$ was obtained from the ultimate analysis calculated on the moisture and ash free basis.

|  | Per cent |
|---|---|
| Carbon | 42.11 |
| Hydrogen | 6.22 |
| Oxygen | 41.40 |

The saponin above described was soluble in water, alcohol, phenol, and glacial acetic acid. Its aqueous solution gave a copious foam when shaken and, when treated with concentrated sulfuric acid the color changed from yellow to deep red, which is generally true of the saponins. Independent toxicity tests indicate that the saponin produced as above outlined is practically non-toxic, which makes it valuable when used in medicine or with soft drink products.

It will be understood, that if desired, the fibrous pulp remaining after the extraction of the juices in the initial step of the process may be steeped in water and the aqueous extract subjected to treatment as outlined above for the expressed juice.

From the foregoing it will be seen that with the process outlined, I am able to recover the saponin from the cactus plants of which there is a boundless supply, and at a cost that will be far less than the method used today wherein the barks have to be imported from the South American countries.

Furthermore, it will be seen that by employing the method set forth, the expense that will be incurred in the method is relatively low.

Having described my invention, what I claim as new and desire to secure by Letters Patent is:

1. A process for the recovery of saponin from the juice of cactus plants and related species comprising expressing the juice from the plants, adding a diatomaceous filter aid to the expressed juice, agitating and filtering, then heating the clarified juice to a temperature of from 85° C. to 110° C., then removing the precipitated matter, then rapidly cooling the filtrate to room temperature, and then filtering the precipitated compounds insoluble at said last mentioned temperature leaving a liquid rich in saponins.

2. A process for the recovery of saponin from the juice of cactus plants and related species comprising expressing the juice from the plants, adding a diatomaceous filter aid to the expressed juice, then agitating and filtering, then heating the clarified juice to approximately 85° C., then rapidly cooling the filtrate to room temperature, then adding a diatomaceous filter aid and filtering the precipitated compounds insoluble at said last mentioned temperature leaving a liquid rich in saponins.

3. A process for the recovery of saponin from the juice of cactus plants and related species comprising expressing the juice from the plants, adding a diatomaceous filter aid to the expressed juice, then agitating and filtering, then heating the clarified juice to approximately 85° C., then rapidly cooling the filtrate to room temperature, then adding a diatomaceous filter aid and filtering the precipitated compounds insoluble at said last mentioned temperature leaving a liquid rich in saponins, followed by treating the liquid rich in saponins with activated carbon, then filtering and finally evaporating to dryness.

4. A process for the recovery of saponin from the juice of cactus plants and related species comprising expressing the juice from the plants, adding a diatomaceous filter aid to the expressed juice, then agitating and filtering, then heating the clarified juice to approximately 85° C., then rapidly cooling the filtrate to room temperature, then adding a diatomaceuos filter aid and filtering the precipitated compounds insoluble at said last mentioned temperature leaving a liquid rich in saponins, followed by treating the liquid rich in saponins with activated carbon, then filtering and finally evaporating the filtrate in a spray drying system to form a soluble powder.

5. A process for obtaining additional saponin from the cactus plant after the main body of juice has been extracted, which consists in subjecting the fibrous pulp remaining after the extraction of the juices to water, then adding to the aqueous dilute extract a diatomaceous filter aid, then agitating and filtering, then heating the clarified juice to approximately 85° C., then rapidly cooling the filtrate to room temperature, then adding a diatomaceous filter aid and filtering the precipitated compounds insoluble at said last mentioned temperature leaving a liquid containing saponin, then treating the said liquid with activated carbon, then filtering and finally evaporating to dryness.

GUSTAV JEAN NORD.